(12) United States Patent
Sue et al.

(10) Patent No.: US 8,256,297 B2
(45) Date of Patent: Sep. 4, 2012

(54) SYSTEMS AND METHODS FOR MEASURING TURBINE BLADE VIBRATORY RESPONSE

(75) Inventors: Peter Ping-Liang Sue, Greenville, SC (US); Holly Davis, Greenville, SC (US); Michael Ball, Greenville, SC (US)

(73) Assignee: General Electric Company, Schenectady, NY (US)

( * ) Notice: Subject to any disclaimer, the term of this patent is extended or adjusted under 35 U.S.C. 154(b) by 517 days.

(21) Appl. No.: 12/652,153

(22) Filed: Jan. 5, 2010

(65) Prior Publication Data
US 2011/0162457 A1 Jul. 7, 2011

(51) Int. Cl.
G01H 9/00 (2006.01)
G01N 29/24 (2006.01)
G01N 29/04 (2006.01)

(52) U.S. Cl. .......................................... 73/643; 73/660

(58) Field of Classification Search .................... 73/643, 73/655, 657, 660, 661
See application file for complete search history.

(56) References Cited

U.S. PATENT DOCUMENTS

| 4,060,329 A * | 11/1977 | Ellis .............................. 356/614 |
| 4,413,519 A * | 11/1983 | Bannister et al. ................ 73/660 |
| 4,507,658 A * | 3/1985 | Keating ......................... 342/118 |
| 5,201,227 A | 4/1993 | Iinuma et al. |
| 5,349,850 A * | 9/1994 | Young ........................ 73/112.01 |
| 7,341,428 B2 | 3/2008 | Twerdochlib |
| 7,775,114 B2 * | 8/2010 | Twerdochlib et al. .......... 73/660 |
| 7,836,772 B2 * | 11/2010 | Twerdochlib .................. 73/661 |
| 2010/0076703 A1 * | 3/2010 | Twerdochlib .................. 702/56 |

* cited by examiner

Primary Examiner — Hezron E Williams
Assistant Examiner — Rose M Miller
(74) Attorney, Agent, or Firm — Sutherland Asbill & Brennan LLP

(57) ABSTRACT

Certain embodiments of the invention may include systems and methods for measuring turbine blade vibratory responses. According to an example embodiment of the invention, a method is provided for measuring a vibratory response of a plurality of turbine blades. The method can include mounting an optical probe comprising at least one probe tip optical surface, wherein the at least one probe tip optical surface is substantially parallel to within about +15 or about −15 degrees with respect to a trailing edge surface of at least one of the plurality of turbine blades, directing light towards a trailing edge surface of at least one of the plurality of turbine blades, receiving reflected light from the at least one of the plurality of turbine blades, and determining relative position of the at least one of the plurality of blades based at least in part on the reflected light.

20 Claims, 4 Drawing Sheets

SYSTEMS AND METHODS FOR MEASURING TURBINE BLADE VIBRATORY RESPONSE

FIELD OF THE INVENTION

This invention generally relates to gas turbines, and more particularly, to systems and methods for measuring turbine blade vibratory responses.

BACKGROUND OF THE INVENTION

Gas turbines typically contain a plurality of turbine blades arranged around the circumference of a rotor. During operation of the gas turbine, expanding gasses produced in an associated turbine combustor impart force on the blades to turn the rotor. The resulting rotational energy may in turn be converted to electrical power via a generator attached to the rotor.

Some turbines contain multiple rows of freestanding blades that are not in contact or supported by adjacent blades, and these freestanding blades can be damaged by excessive vibration due to dynamic conditions such as flow induced vibration, combustion dynamics, and nozzle effects. It is therefore desirable to monitor the blade vibrations so that turbine failure can be avoided. Conventional methods for measuring the blade vibrations include the use of strain gauges attached to the blades. However, such monitoring methods are usually very complex and expensive due to the electrical connections between stationary and rotating components. Other conventional methods for measuring the vibratory response of the blades during operation include capacitance, magnetic, or optical probes mounted to the blade shroud to measure the blade tips as they pass by the probes. However, many of these blade-tip measurement techniques are of limited utility because they do not directly measure torsional and other vibrations at the blade edges.

Other methods for measuring the vibratory response of the turbine blades have been attempted, but the hostile environment within the turbine can be a difficult challenge. Relatively high temperatures within the turbine combustor often reach or exceed 1,200 degrees F. (649 Celsius), which is above the melting temperature of many sensor materials. Furthermore, combustion byproducts and exhaust can contaminate the sensor components.

For example, mirrors have been placed at the end of optical probes near the trailing edge of a row of turbine blades to direct laser light perpendicular to the surface of the turbine blade trailing edge. The light reflected by the turbine blades is then re-directed by the same mirror back to a detector that may reside outside of the hostile environment of the turbine. The mirror in this case enables directing laser light into the exhaust frame at an acute angle with respect to either vertical or horizontal direction, while the path of the light may be modified by the mirror such that it is incident perpendicular to the surface of the trailing blade edge. The light reflected from the trailing blade edge can then re-directed by the mirror along the optical path to the detector. One problem with this approach is that the turbine exhaust gas can contain unburned fuel, leftover combustion chemical species, and other debris that can cause the optical probe and the mirror to become dirty over time, thereby reducing the signal needed to determine the vibratory response of the blades. Cleaning the optical element and the mirror can be difficult in such configuration due to limited accessibility.

Therefore, a need remains for improved systems and methods for measuring turbine blade vibratory responses.

BRIEF SUMMARY OF THE INVENTION

Some or all of the above needs may be addressed by certain embodiments of the invention. Certain embodiments of the invention may include systems and methods for measuring turbine blade vibratory responses. Other embodiments of the invention may include systems and methods for measuring turbine blade vibratory responses during turbine operation. Yet other embodiments of the invention may include a cleanable turbine blade trailing edge optical probe.

According to an example embodiment of the invention, a method is provided for measuring a vibratory response of a plurality of turbine blades. The method can include mounting an optical probe comprising at least one probe tip optical surface, wherein the at least one probe tip optical surface is substantially parallel to within about +15 or about −15 degrees with respect to a trailing edge surface of at least one of the plurality of turbine blades, directing light towards a trailing edge surface of at least one of the plurality of turbine blades, receiving reflected light from the at least one of the plurality of turbine blades, and determining relative position of the at least one of the plurality of turbine blades based at least in part on the reflected light.

According to another example embodiment, a gas turbine system is provided. The gas turbine system may include: a compressor, a combustor, a plurality of turbine blades, and an optical probe comprising at least one optical probe tip surface. The optical probe is operable to direct light towards a trailing edge surface of at least one of the plurality of turbine blades, and is further operable to receive light reflected from a trailing edge surface of at least one of the plurality of turbine blades, wherein the at least one probe tip optical surface is substantially parallel to the trailing edge surface of the at least one of the plurality of turbine blades.

According to another example embodiment, an apparatus is provided for use in measuring a vibratory response of a plurality of turbine blades during turbine operation. The apparatus may include an optical probe. The optical probe may include one or more associated probe tip optical surfaces positioned substantially parallel to a trailing edge surface of at least one of the plurality of turbine blades. The optical probe may further include at least one waveguide bore comprising at least one transmitting optical fiber and at least one receiving optical fiber, at least one air bore configured to transmit pressurized air through the optical probe, and a tip comprising at least one tip air bore in communication with the at least one air bore and configured to cool the optical fibers and to purge debris from the one or more associated probe tip optical surfaces.

Other embodiments and aspects of the invention are described in detail herein and are considered a part of the claimed invention. Other embodiments and aspects can be understood with reference to the following detailed description, accompanying drawings, and appended claims.

BRIEF DESCRIPTION OF THE FIGURES

Reference will now be made to the accompanying tables and drawings, which are not necessarily drawn to scale, and wherein.

DETAILED DESCRIPTION OF THE INVENTION

Figure 1:
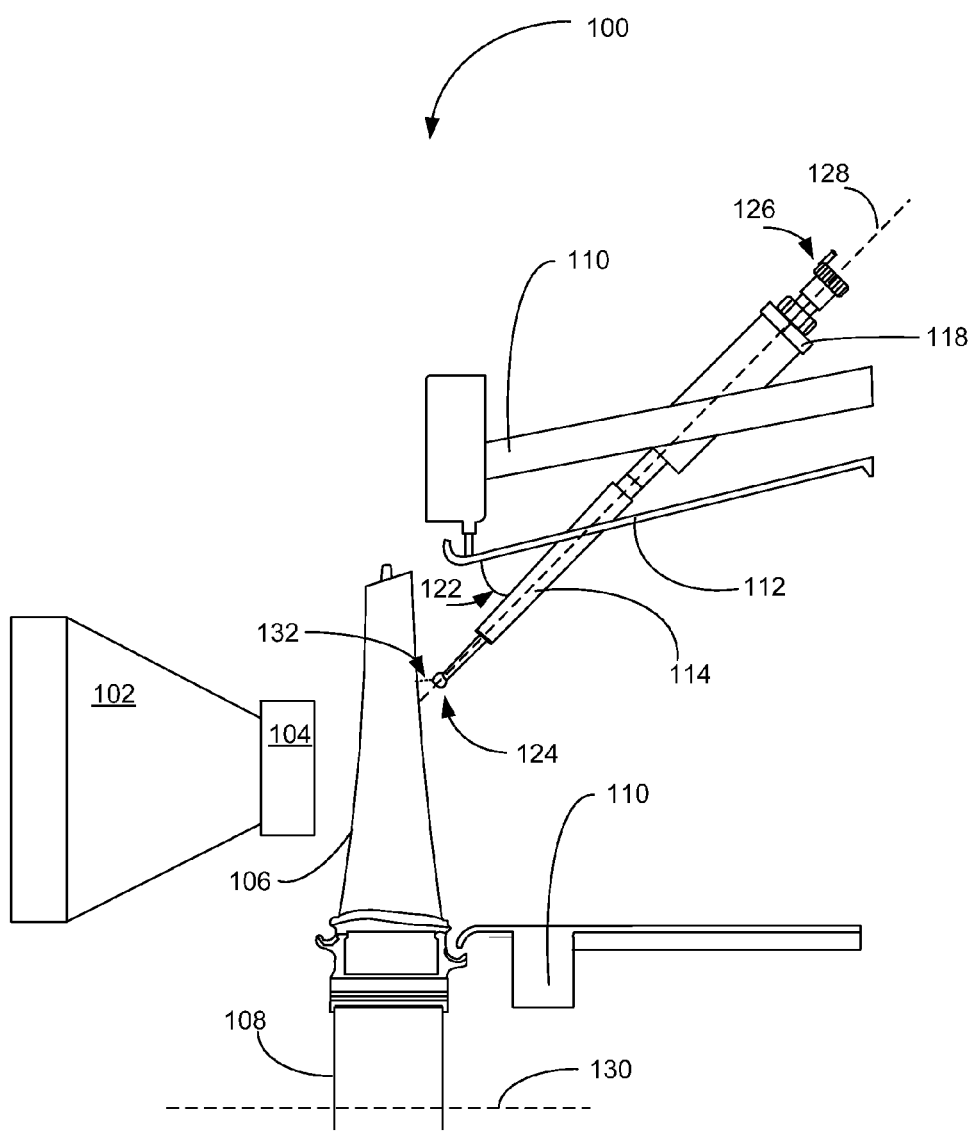
FIG. 1 is a block diagram of an illustrative gas turbine system, according to an exemplary embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. The term "exemplary" as used throughout this document is defined to mean "example."

Certain embodiments of the invention may enable measurements of turbine blade vibrations during the operation of the turbine. According to certain exemplary embodiments of the invention, an optical probe may be utilized to determine when a portion of the turbine blade trailing edge passes across the tip of the optical probe. The optical probe may utilize forced air to purge dirt and combustion contaminants from the probe's optical surfaces, while simultaneously cooling the optical components within the probe. Certain embodiments of the invention also allow the probe to be cleaned between operation cycles of the gas turbine.

In accordance with exemplary embodiments of the invention, laser light may be transmitted from a laser source, through a transmitting optical fiber to the trailing edge of a passing turbine blade. According to an exemplary embodiment, the transmitting optical fiber may be a single mode optical fiber. The reflected laser light from each turbine blade may be received by a receiving optical fiber. The receiving optical fiber, for example, may be a multimode optical fiber. The received light may pass through the receiving optical fiber to an optical detector for conversion to electrical signals, which may be digitized by a processor to determine the arrival time for each passing turbine blade. According to exemplary embodiments, timing data may then be processed to calculate the vibratory responses of each turbine blade.

To overcome issues associated with cleaning the optical surfaces of the optical probe, a probe tip is provided. According to an exemplary embodiment, an optical element about 0.125 inch (3.175 mm) in diameter can be bent approximately 45 degree near the probe tip and extended to be as close to the probe tip as possible, but still be protected by the probe tip. In an exemplary embodiment, the optical element may be recessed to within about 1 micron to 1 mm from the probe tip end. An access hole may be provided in the turbine frame to allow a person to use a small tool to clean the optics after each cycle is completed.

Since a large portion of the trailing edge probe is subject to exhaust and temperatures near 1,200 F (649 Celsius), the optical element must have the ability to sustain the heat for a long period of time throughout the entire testing cycle. Therefore, according to an exemplary embodiment of the invention, high-pressure cooling air may be supplied to flow through the main body and exit at the probe tip to cool the entire probe. According to exemplary embodiments, the high-pressure cooling air may be pressurized from about 150 pounds per square inch (psi) (1.03 MPa) to about 250 psi (1.72 MPa).

According to exemplary embodiments of the invention, the probe tip may include a plurality of air purging holes so the flow at the tip is choked to maximize purging and cleaning of the optical element surfaces during operation. With the combination of purging and manual cleaning, the optical element may stay clean and operational.

Another aspect of the invention is that the optical probe enables taking vibration measurements at the edges of the turbine blades, whereas conventional blade-tip probes do not provide access to the blade edges. Furthermore, another aspect of the invention is that it provides near normal incidence and reflection of the probing optical light with respect to the blade edge surface, thereby providing high optical efficiency.

Various system components for facilitating the measurements of the turbine blades, for cooling the optical probe, and for cleaning the optical surfaces of the probe, according to exemplary embodiments of the invention, will now be described with reference to the accompanying figures.

FIG. 1 illustrates an exemplary gas turbine system 100. According to exemplary embodiments of the invention, the gas turbine system 100 may include a compressor 102, a combustor 104, and a plurality of turbine blades 106 attached to a rotor 108. Compressed air and gas may be directed from the compressor 102 to the combustor 104 where it may be ignited. The resulting combustion gasses may force past the angled turbine blades 106 to rotate the rotor 108 about a rotor axis 130. After passing by the turbine blades 106, the exhaust gasses may be directed to an exhaust port via an exhaust frame 110 and a diffuser 112.

According to exemplary embodiments of the invention, an optical probe 114 may protrude at an acute angle 122 through appropriately sized holes in the exhaust frame 110 and diffuser 112. Various sleeves 118 may facilitate mounting the optical probe 114 to the exhaust frame and/or diffuser 112. The optical probe 114 may have a first end 124, a second end 126, and a longitudinal axis 128. The longitudinal axis 128 of the optical probe 114 may be angled with respect to the diffuser 112 and/or the exhaust frame 110 at an acute angle 122 to facilitate probing the trailing edge of the turbine blade 106 at the desired location along the length of the turbine blade 106. In an exemplary embodiment, the first end 124 of the optical probe 114 may be positioned approximately 2 to 3 centimeters from the trailing edge of the turbine blades 106. In other exemplary embodiments, the first end 124 of the optical probe 114 may be positioned from the trailing edge of the turbine blades 106 within a range of about 1 centimeter to about 10 centimeters.

According to exemplary embodiments of the invention, the first end 124 of the optical probe 114 may be further angled to transmit light to the turbine blade 106 at an angle substantially normal to the surface of the trailing edge of the blades 132. The first end 124 of the optical probe 114 may also receive light reflected from the turbine blade 106.

According to exemplary embodiments of the invention, the second end 126 of the optical probe may be operable to accept pressurized air for cooling the optical probe 114. The pressurized cooling air may exit the first end 124 of the optical probe 114 in such a way that the cooling air exiting from the first end purges or cleans the optical surfaces of the optical probe 114.

Figure 2:
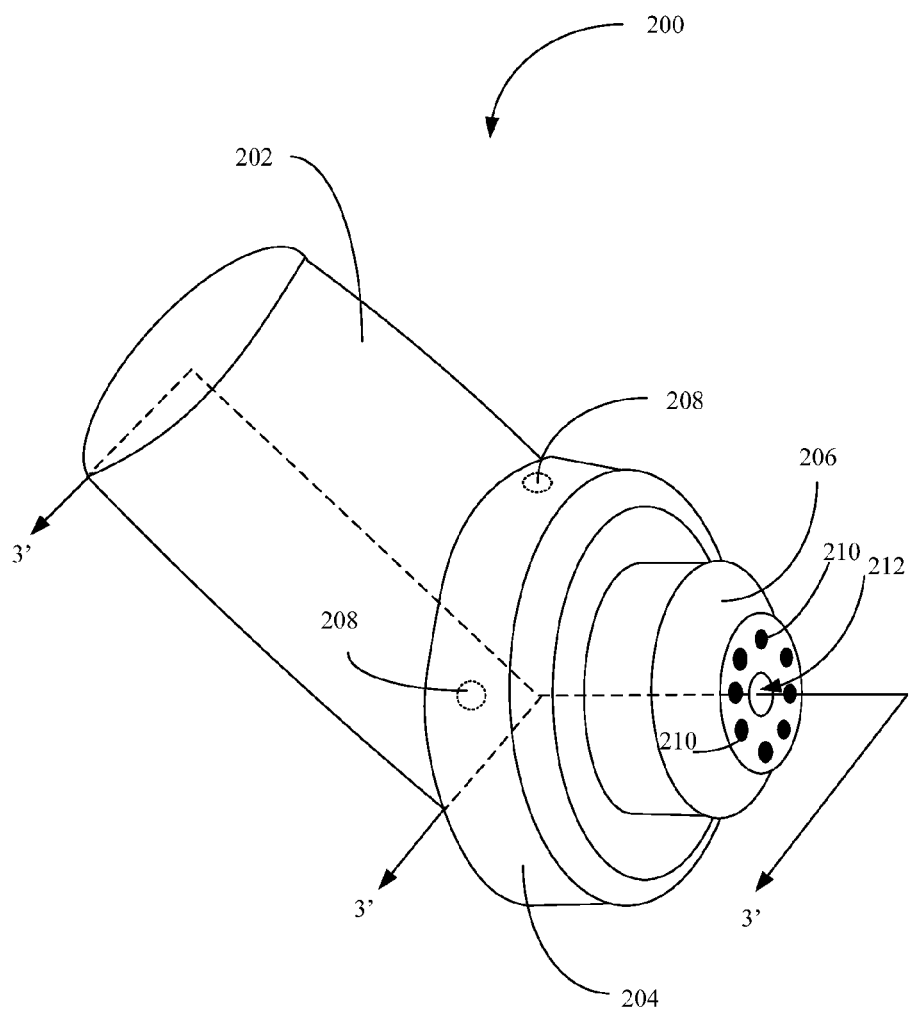
FIG. 2 is a perspective view of an illustrative optical probe, according to an exemplary embodiment of the invention.

FIG. 2 is a perspective view of a probe tip assembly 200, corresponding to the first end 124 of an optical probe 114, as shown in FIG. 1, and according to an exemplary embodiment of the invention. The probe tip assembly 200 may include a main tube 202, a collar 204, a tip 206, optional setscrew apertures 208, air holes 210, and optical surfaces 212.

According to an exemplary embodiment of the invention, tip 206 may be angled with respect to the longitudinal axis 128 of the optical probe 114. The collar 204 may provide an angled joining surface and aperture for attaching the tip 206 to the main tube 202. Setscrews may enter the setscrew apertures 208 in the collar 204 to secure the tip 206 to the collar 204. According to exemplary embodiments of the invention, the optical surfaces 212 may be surrounded by a plurality of air holes 210.

Figure 3:
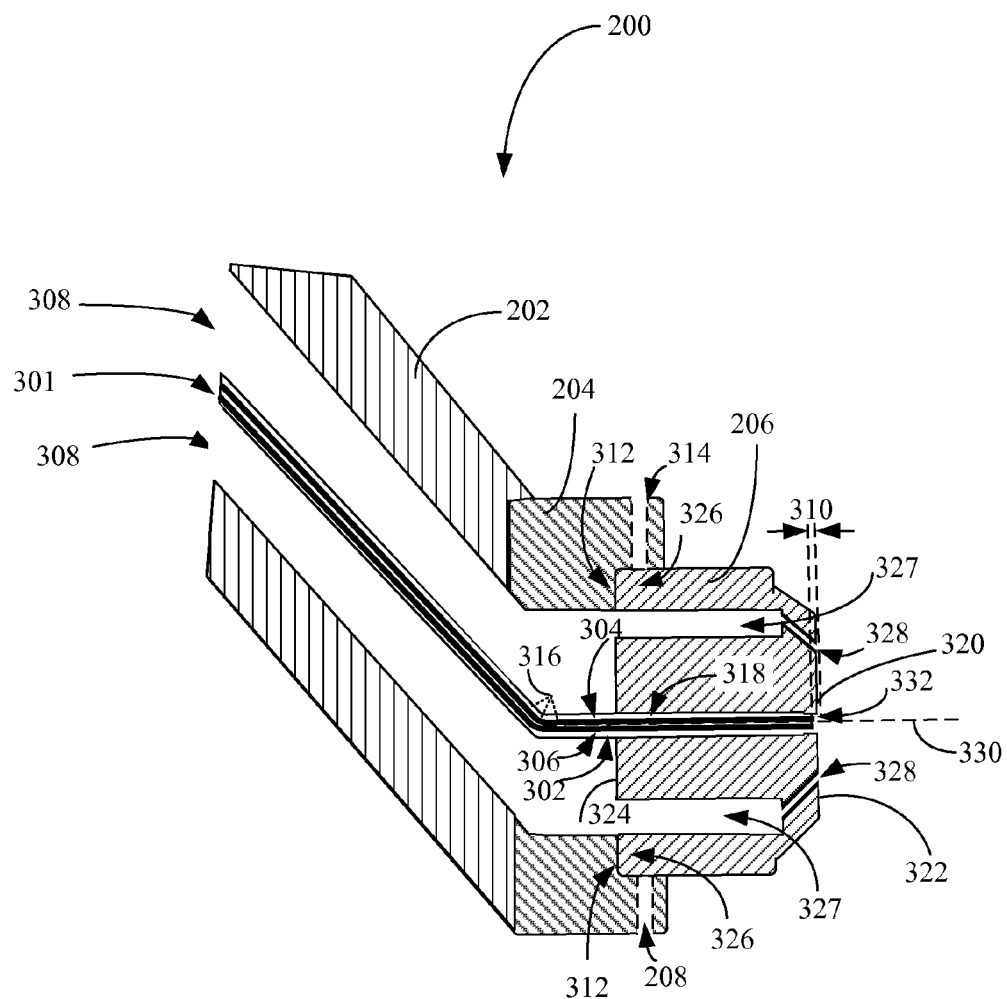
FIG. 3 is a side sectional view of an illustrative optical probe, according to an exemplary embodiment of the invention.

FIG. 3 depicts an exemplary cross sectional view of the probe tip assembly 200 through the section defined by sectional lines 3' in FIG. 2. According to exemplary embodiments of the invention, the probe tip assembly 200 may include a waveguide and air bore 301 that may be defined throughout the length of the main tube 202. An optical fiber tube 302 may be inserted into the waveguide and air bore 301, and the optical fiber tube may extend through the length of the optical probe 114 from the second end 126 to the first end 124. According to exemplary embodiments of the invention, a transmitting optical fiber 304 and a receiving optical fiber 306 may be inserted into the optical fiber tube 302.

According to exemplary embodiments of the invention, the first end of the optical fiber and tube 320 may be slightly recessed within the first end tip 322 to provide fiber end-to-tip clearance 310 of about 1 micron to about 1 millimeter to protect the end of the transmitting 304 and receiving 306 optical fibers. The fiber end-to-tip clearance 310 may also allow for cleaning of the optical surfaces 212 at the ends of the transmitting 304 and receiving 306 optical fibers without damaging the optical fibers 304, 306.

According to exemplary embodiments of the invention, the waveguide and air bore 301 may further define an air bore 308 that may allow purge air to pass from the first end 124 to the second end 126 of the optical probe 114. The purge air may serve the dual purpose of cooling the optical fibers 304, 306 and purging exhaust and combustion debris from the optical surfaces 212. According to exemplary embodiments, the air bore 308 may continue through the collar 204, and the air bore 308 may be in communication with a tip body air bore 327. The tip body air bore 327 may be in communication with plurality of tip end air bores 328. The plurality of tip end air bores 328 may define air holes 210 at the second end of the tip 324, and the plurality of tip end air bores 328 may be angled about 30 degrees to about 60 degrees towards the tip axis 330 to direct air towards the tip exit aperture 332.

FIG. 3 depicts additional features of the probe assembly tip 200 according to exemplary embodiments of the invention. For example, the optical fiber tube 302, transmitting fiber 304, and receiving fiber 306 may undergo a bend radius 316 in order to enter the angled tip 206 within the optical fiber and tube bore 318. The bend radius 316 may be large enough that the optical fibers 304, 306 do not suffer appreciable bend losses. According to exemplary embodiments of the invention, the collar 204 may be press fit, or welded to the main tube 202 at an angle to facilitate near normal light incidence with the turbine blade.

According to exemplary embodiments of the invention, the probe tip assembly 200 may be advantageously assembled by inserting optical fibers 304, 306 and optical fiber tubing 302 through the main tube 202 to the first end of the optical probe 124 before inserting the tip 206 into a collar tip bore 326. The optical fibers 304, 306 and optical fiber tubing 302 may then be carefully threaded into the optical fiber and tube bore 318, and the fiber end to tip clearance 310 may be controlled by defining a narrowing the optical fiber and tube bore 318 at or near the first end of the optical fiber and tube 320. Once the optical fibers 304, 306 and optical fiber tubing 302 are properly inserted into the optical fiber and tube bore 318, the tip 206 may be inserted into the collar tip bore to make a snug fit at the press fit interface 312.

According to exemplary embodiments of the invention, the tip 206 may be secured to the collar 204 by inserting setscrews into the optional setscrew apertures 208. The setscrews may be threaded and the threads may mate with the threaded setscrew bores 314. Upon tightening the setscrews, the tip 206 may be secured to the collar 204.

According to exemplary embodiments of the invention, the optical probe 114 may include a tip exit aperture 332 in communication with the optical fiber and tube bore 318. The tip exit aperture 318 may permit light to exit the transmitting fiber 304, reflect from the turbine blades 106, and be received by the receiving fiber 304. According to an exemplary embodiment, the turbine blades 106 may be selectively painted with, for example, Rockide® coatings, alumina-based materials, or other suitable coatings to increase the reflectivity of the turbine blades 106.

According to exemplary embodiments of the invention, the transmitting fiber 304 may be single-mode fiber, and the light coupled into the transmitting fiber 304 may include wavelengths in the near infra-red or visible range. For example, a laser diode may be utilized to couple light into the transmitting fiber 304, and the laser diode may produce light in the wavelength range of about 650 nm to about 850 nm. According to exemplary embodiments of the invention, the receiving optical fiber 306 may include a multimode fiber with a large effective numerical aperture for accepting reflected light. In other exemplary embodiments of the invention, multiple receiving optical fibers 306 may be utilized to increase the signal strength of the reflected light. In other exemplary embodiments, small lenses, for example, graded index (GRIN) lenses, may be fitted at the end of the transmitting 304 and/or the receiving 306 optical fibers to help focus the light transmitted by the transmitting fiber 305 and/or to increase the acceptance angle of the receiving optical fiber 306.

Figure 4:
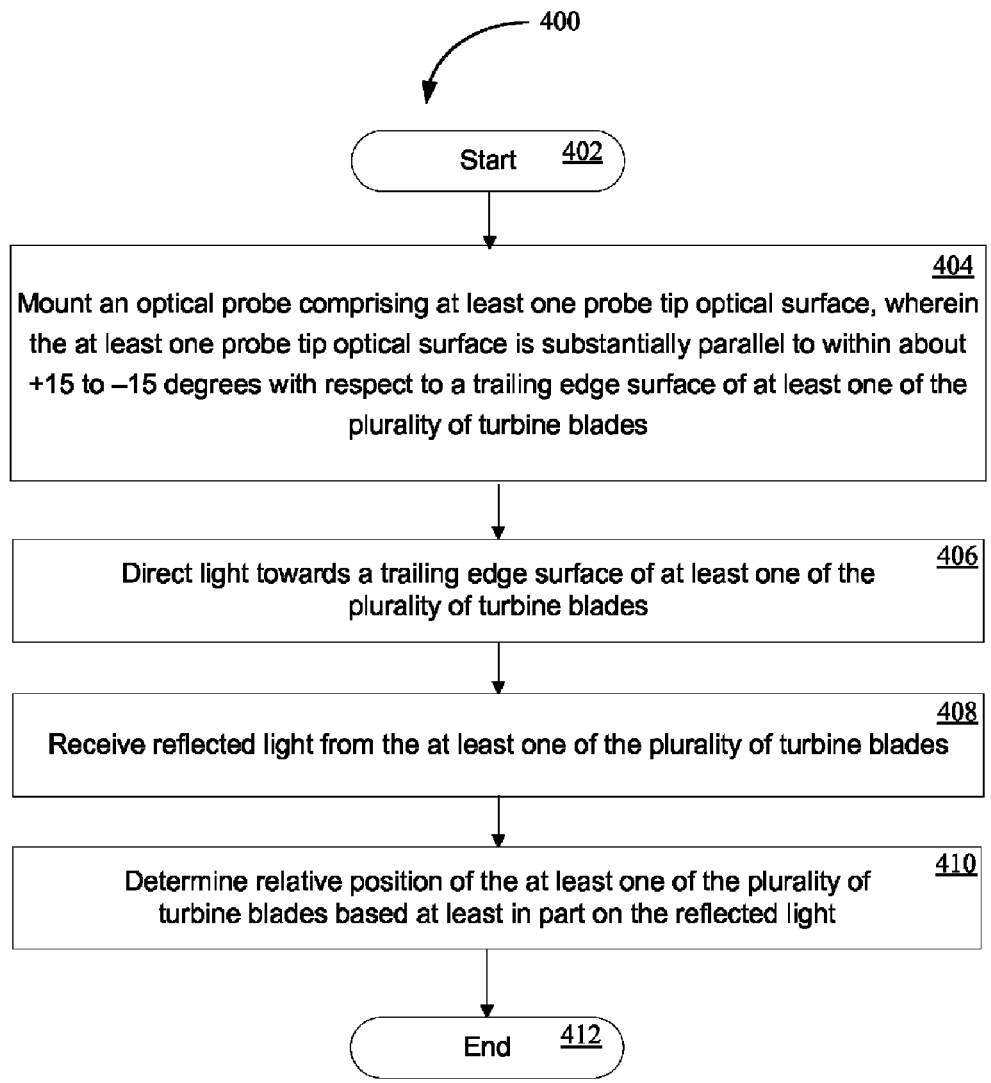
FIG. 4 is a flow diagram of an exemplary method according to an exemplary embodiment of the invention.

An exemplary method 400 for determining the relative position and vibratory response of the turbine blades 106 will now be described with reference to the flowchart of FIG. 4. The method 400 starts in block 402. In block 404 and according to an exemplary embodiment of the invention, an optical probe may be mounted. The optical probe may comprise at least one probe tip optical surface, wherein the at least one probe tip optical surface is substantially parallel to within about +15 to about −15 degrees with respect to a trailing edge surface of at least one of the plurality of turbine blades. In block 406, and according to an exemplary embodiment, light may be directed towards a trailing edge surface of at least one of the plurality of turbine blades. In block 408, and according to an exemplary embodiment, reflected light may be receive from the at least one of the plurality of turbine blades. In block 410, and according to an exemplary embodiment, a relative position of the at least one of the plurality of turbine blades is determined based at least in part on the reflected light. The method 400 ends in block 412.

Accordingly, exemplary embodiments of the invention can provide the technical effects of creating certain systems and methods that determine the relative position of at least one of a plurality of turbine blades 106 based on light reflected from the turbine blade 106. Exemplary embodiments of the invention can provide the further technical effects of providing systems and methods for determining the vibratory response of the turbine blades 106. Exemplary embodiments of the invention can provide the further technical effects of providing systems and methods for cooling optical fibers and components during operation of the turbine to keep the components from being damaged by heat, and to simultaneously purge debris from the probe's optical surfaces. Exemplary embodiments of the invention can provide the further technical effects of providing systems and methods for cleaning optical surfaces of the probe.

As desired, embodiments of the invention may include the gas turbine system 100 and the probe tip assembly 200 with more or less of the components illustrated in FIGS. 1, 2, and 3.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for measuring a vibratory response of a plurality of turbine blades, the method comprising:
    mounting an optical probe comprising a probe tip, the probe tip comprising at least one probe tip optical surface, wherein the at least one optical surface is substantially parallel to within about +15 or about −15 degrees with respect to a trailing edge surface of at least one of the plurality of turbine blades;
    directing light towards the trailing edge surface of the at least one of the plurality of turbine blades at an angle substantially normal to the trailing edge surface;
    receiving reflected light from the at least one of the plurality of turbine blades; and
    determining relative position of the at least one of the plurality of turbine blades based at least in part on the reflected light.

2. The method of claim 1, further comprising transmitting purge air through an air bore of the optical probe to cool optical fibers of the optical probe and to purge debris from the at least one optical surface.

3. The method of claim 1, further comprising increasing optical reflectivity of the trailing edge surface of the at least one of the plurality of turbine blades by applying a heat resistant reflective material to the trailing edge surface.

4. The method of claim 1, wherein the optical probe further comprises at least one waveguide bore extending within the optical probe from a first end to a second end of the optical probe, wherein the waveguide bore is configured to receive an optical fiber tube, and wherein the optical fiber tube is operable to receive a plurality of optical fibers.

5. The method of claim 4, wherein the optical probe further comprises:
    a collar positioned at an acute angle to the first end of the optical probe;
    wherein the probe tip is mounted to the collar.

6. The method of claim 5, wherein the probe tip is mounted to the collar by way of heating the collar to press fit the probe tip adjacent to the collar.

7. The method of claim 5, wherein the plurality of optical fibers and the optical fiber tube are recessed about 1 micron to about 1 millimeter from an end of the probe tip.

8. A gas turbine system comprising:
    a compressor;
    a combustor;
    a plurality of turbine blades; and
    an optical probe comprising a probe tip, the probe tip comprising at least one probe tip optical surface, the optical probe operable to direct light towards a trailing edge surface of at least one of the plurality of turbine blades at an angle substantially normal to the trailing edge surface, and wherein the optical probe is further operable to receive light reflected from the trailing edge surface of the at least one of the plurality of turbine blades, wherein the at least one optical surface is substantially parallel to the trailing edge surface of the at least one of the plurality of turbine blades.

9. The gas turbine system of claim 8 further comprising a primary air bore extending through the optical probe and in communication with one or more air bores of the probe tip that define one or more air holes at an end of the probe tip to cool optical fibers and to purge debris from the at least one optical surface.

10. The gas turbine system of claim 9, wherein the one or more air bores of the probe tip are angled at about 30 degrees to about 60 degrees towards an axis of the probe tip.

11. The gas turbine system of claim 8, wherein the plurality of turbine blades comprises a heat-resistant reflective material applied to at least the trailing edge surface of each of the plurality of turbine blades.

12. The gas turbine system of claim 8, wherein the optical probe comprises at least one waveguide bore extending within the optical probe from a first end to a second end of the optical probe, wherein the waveguide bore is configured to receive an optical fiber tube, and wherein the optical fiber tube is operable to receive a plurality of optical fibers.

13. The gas turbine system of claim 12, wherein the optical probe comprises:
    a collar attached at an acute angle to the first end of the optical probe;
    wherein the probe tip is mounted to the collar.

14. The gas turbine system of claim 13, wherein the probe tip is mounted to the collar by heating the collar to press fit the probe tip adjacent to the collar.

15. The gas turbine system of claim 13, wherein the plurality of optical fibers and the optical fiber tube are recessed about 500 microns to about 1000 microns from an end of the probe tip.

16. An apparatus for use in measuring a vibratory response of a plurality of turbine blades during turbine operation, the apparatus comprising:
    an optical probe comprising a probe tip, the probe tip comprising at least one probe tip optical surface, wherein the at least one optical surface is positioned substantially parallel to a trailing edge surface of at least one of the plurality of turbine blades, wherein the optical probe further comprises:
    at least one waveguide bore comprising at least one transmitting optical fiber and at least one receiving optical fiber, wherein the at least one transmitting optical fiber transmits light at an angle substantially normal to the trailing edge surface;

at least one primary air bore configured to transmit pressurized air through the optical probe; and at least one air bore of the probe tip in communication with the at least one primary air bore and configured to cool the at least one transmitting optical fiber and at least one receiving optical fiber and to purge debris from the at least one optical surface.

17. The apparatus of claim 16, wherein the optical probe further comprises a collar, wherein the collar comprises a collar tip bore in communication with the at least one primary air bore and configured to receive the probe tip and the at least one transmitting optical fiber and the at least one receiving optical fiber, wherein the collar is positioned at an acute angle to a first end of the optical probe.

18. The apparatus of claim 16, wherein the probe tip is configured to mount to a collar tip bore at a press fit interface, and wherein the probe tip further comprises one or more air holes in communication with the at least one air bore of the probe tip, wherein the one or more air holes are angled at about 30 degrees to about 60 degrees towards an axis of the probe tip.

19. The apparatus of claim 16, further comprising a collar positioned at an acute angle to a first end of the optical probe wherein the probe tip mounts to the collar by heating the collar to press fit the probe tip adjacent to the collar.

20. The apparatus of claim 16, wherein the at least one transmitting optical fiber and at least one receiving optical fiber are inserted into an optical fiber tube that extends into an aperture of the probe tip to protect ends of the optical fibers and to allow cleaning of the optical fibers.

\* \* \* \* \*